(12) United States Patent
Nassef

(10) Patent No.: US 6,905,609 B2
(45) Date of Patent: Jun. 14, 2005

(54) WASTE TREATMENT AND DISPOSAL SYSTEM

(76) Inventor: Namon A. Nassef, 11562 Clearcreek Dr., Pensacola, FL (US) 32514

( * ) Notice: Subject to any disclaimer, the term of this patent is extended or adjusted under 35 U.S.C. 154(b) by 0 days.

(21) Appl. No.: 10/360,049

(22) Filed: Feb. 6, 2003

(65) Prior Publication Data

US 2004/0154968 A1 Aug. 12, 2004

(51) Int. Cl.$^7$ .............................. C02F 1/78; B01F 7/00; E03D 9/10
(52) U.S. Cl. ...................... 210/760; 210/173; 210/175; 210/198.1; 210/416.1; 366/144; 366/340
(58) Field of Search ................................ 210/173, 175, 210/198.1, 416.1, 749, 758, 760, 74; 366/144, 340

(56) References Cited

U.S. PATENT DOCUMENTS

| | | | | |
|---|---|---|---|---|
| 2,578,274 A | * | 12/1951 | Dunton et al. ................. | 241/21 |
| 3,752,059 A | * | 8/1973 | Boyer .......................... | 100/37 |
| 3,910,775 A | * | 10/1975 | Jackman ...................... | 44/589 |
| 3,948,774 A | * | 4/1976 | Lindman ..................... | 210/192 |
| 4,370,235 A | * | 1/1983 | Suzuki et al. ................ | 210/620 |
| 4,406,795 A | * | 9/1983 | Takacs et al. ................ | 210/771 |
| 4,408,892 A | * | 10/1983 | Combes et al. .............. | 366/337 |
| 4,539,111 A | * | 9/1985 | Takacs et al. ................ | 210/179 |
| 4,909,635 A | * | 3/1990 | Lecoffre et al. ............. | 366/337 |
| 5,124,095 A | * | 6/1992 | Gianni et al. ............... | 264/45.5 |
| 6,106,703 A | * | 8/2000 | Nassef ......................... | 210/85 |
| 6,337,308 B1 | * | 1/2002 | Adams et al. ............... | 507/117 |

FOREIGN PATENT DOCUMENTS

JP          59-104328 A   *   6/1984

* cited by examiner

Primary Examiner—Fred G. Prince

(57) ABSTRACT

The present invention relates to the treatment and disposal of waste, including sanitary, petroleum, and other organic wastes. More specifically, the present invention treats and disposes of these types of waste from portable and remote waste generating sources, such as passenger carrying vehicles and remote facilities where sewage and septic systems are impractical. The invention makes use of thermal energy liberated from devices that generate a hot exhaust stream, such as internal combustion engines. The invention generally involves the passing of a waste material from a tank through a homogenizing device. The homogenizing device reduces the particle size and thoroughly mixes the waste stream so that it maybe injected into a hot exhaust stream, which converts the waste stream into water vapor, gas and inert ash.

57 Claims, 6 Drawing Sheets

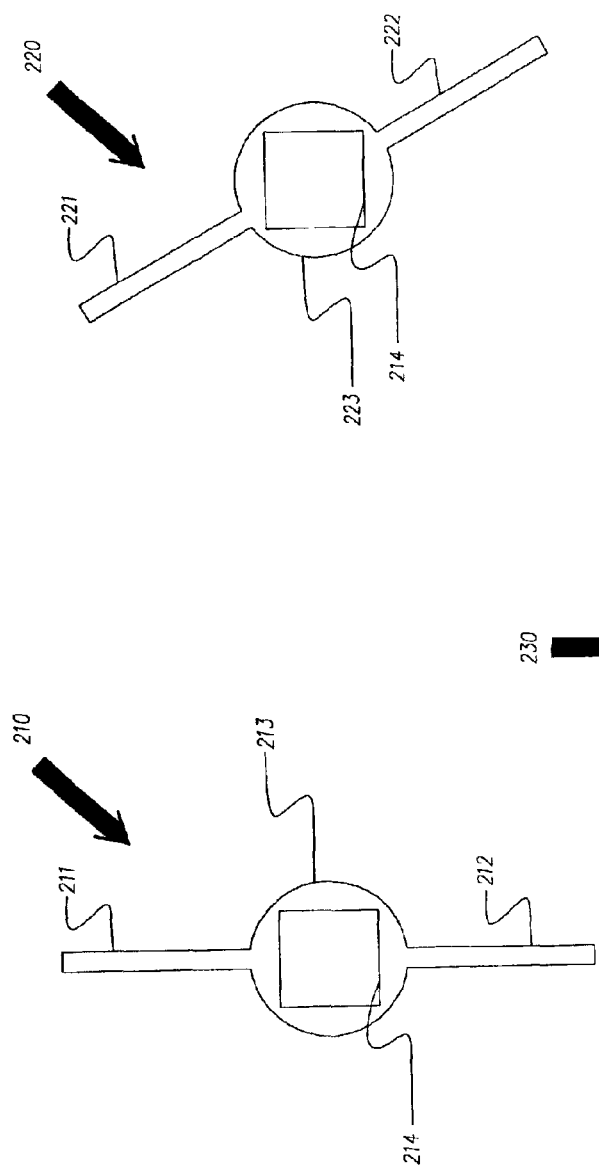

WASTE TREATMENT AND DISPOSAL SYSTEM

STATEMENT REGARDING FEDERALLY SPONSORED RESEARCH OR DEVELOPMENT

Not Applicable

FIELD OF THE INVENTION

The present invention relates to an improved system for the efficient and ecological treatment and disposal of sanitary and organic waste. More specifically, the present invention relates to the treatment and disposal of human waste and other similar organic wastes generated from mobile operations, such as passenger carrying vehicles, or fixed operations where conventional means of treatment and disposal are impractical. The treatment and disposal system described herein utilizes the heat exhausted during the operation of an internal combustion engine or any other device that exhausts sufficient heat to adequately dispose of the waste. The present invention is also capable of the treatment and disposal of waste comprising petroleum and/or other organic compounds, including industrial waste, such as bilge water and other oily water waste.

BACKGROUND OF THE INVENTION

There are several traditional methods of treating and disposing of waste. The choice of a particular treatment and disposal method depends primarily upon two factors: 1) the particular waste requiring treatment and disposal, and 2) the particular location within which the treatment and disposal facility must be installed. Of particular concern is the treatment and disposal of human waste, often referred to as sanitary waste, which contains bacteria, particularly fecal coliform bacteria, that poses a significant health hazard in excess concentration. The generation of sanitary waste often occurs in locations, such as remote or portable facilities, that present unique problems associated with treatment and disposal. Conventional waste treatment and disposal systems have been designed for these situations; however, conventional systems have several drawbacks.

Conventional waste treatment and disposal systems for remote and portable facilities typically comprise a large holding tank to receive and accumulate waste. The waste may be disinfected using appropriate chemicals and once disinfected, the waste is usually stored until it can be removed for further processing elsewhere. For portable facilities, such as vehicles, watercraft, aircraft and railroad cars, the waste must be stored until the portable facility reaches a waste receiving site. For remote facilities, particularly those in which traditional sewers and septic systems are impractical, the waste must be stored until such time that the waste can be removed and delivered to a waste receiving site. The need to store chemicals, as well as the treated waste, requires significant storage capacity and increases both the cost of constructing and operating the portable or remote facility.

In the case of watercraft, conventional treatment and disposal systems treat waste material with chemicals and/or indirect heat to destroy bacterial content. Once treated, the waste may be discharged into the environment. Chemical systems have a number of disadvantages, including the expense of the chemicals they employ and the noxious odors liberated with their use. Also, chemical systems are not always totally effective in killing bacteria, so that the discharged waste material may still cause pollution and environmental problems. Systems employing indirect heat to sterilize the waste material also have drawbacks, particularly the extremely large amount of heat transfer area required to adequately sterilize the waste and the potential need for chemical oxidizers and a fuel supply to generate the required heat, which both result in an increase of construction and operating expense.

In addition, increasingly strict environmental regulations prohibit the discharge of even treated waste material in certain areas, such as inland waterways and lakes. Conventional treatment and disposal systems cannot be used in these areas, thus requiring the installation of adequate storage capacity for holding the waste until a waste receiving site can be reached. The expense and inconvenience of having to locate and travel to a waste receiving site serves as an incentive to disregard regulations and discharge the holding tank directly into the environment, frustrating the purposes of the environmental regulations.

In U.S. Pat. No. 6,106,703, the named inventor herein disclosed a waste treatment and disposal system that utilized the exhaust of an internal combustion engine to dispose of sanitary and other types of waste. The disclosure of U.S. Pat. No. 6,106,703 is incorporated herein by reference. That patent generally discloses, a waste treatment system comprised of a holding tank for receiving waste generated from an input source, such as a head, galley, shower, bilge tank, or other similar source, at least one macerator connected to the holding tank, a reducer for decreasing the particle size of solid waste, a centrifugal separator, an injector pump, and an injector nozzle disposed within the exhaust manifold of an internal combustion engine.

The present invention improves upon the waste treatment and disposal system disclosed in U.S. Pat. No. 6,106,703 in several ways. The present invention simplifies system operation by utilizing a common energy source for fluid movement devices. Additionally, the present invention incorporates ozone generators and high frequency activators to condition waste prior to thermal treatment. The present invention also incorporates liquid/liquid and gas/liquid preheaters that thermally condition the waste prior to injection into an exhaust stream. Preheating the waste increases disposal efficiency and increases operational capacity limits. Significant improvements were made to the reducer, referred to herein as the homogenizer, including improvements to the sizing screen design, improvements to the blade design, modification of the device to allow reverse operation, addition of a recirculation inlet port, and external pumping capability. These modifications improved particle attrition and eliminate the need for solid waste separation devices, such as the centrifugal separator. The present invention also improves upon the injector design with the addition of an exhaust manifold spool piece that eliminates the need to modify existing exhaust manifolds. Finally, process control improvements are added, which along with the other modifications, improve overall system efficiency and performance and reduce the space required for installation of the system.

BRIEF DESCRIPTION OF THE DRAWINGS

FIG. 6 is a front perspective view of the first of three blades utilized for the blade assembly of FIG. 4.

FIG. 7 is a front perspective view of the second of three blades utilized for the blade assembly of FIG. 4.

FIG. 8 is a front perspective view of the third of three blades utilized for the blade assembly of FIG. 4.

PREFERRED EMBODIMENTS OF THE INVENTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
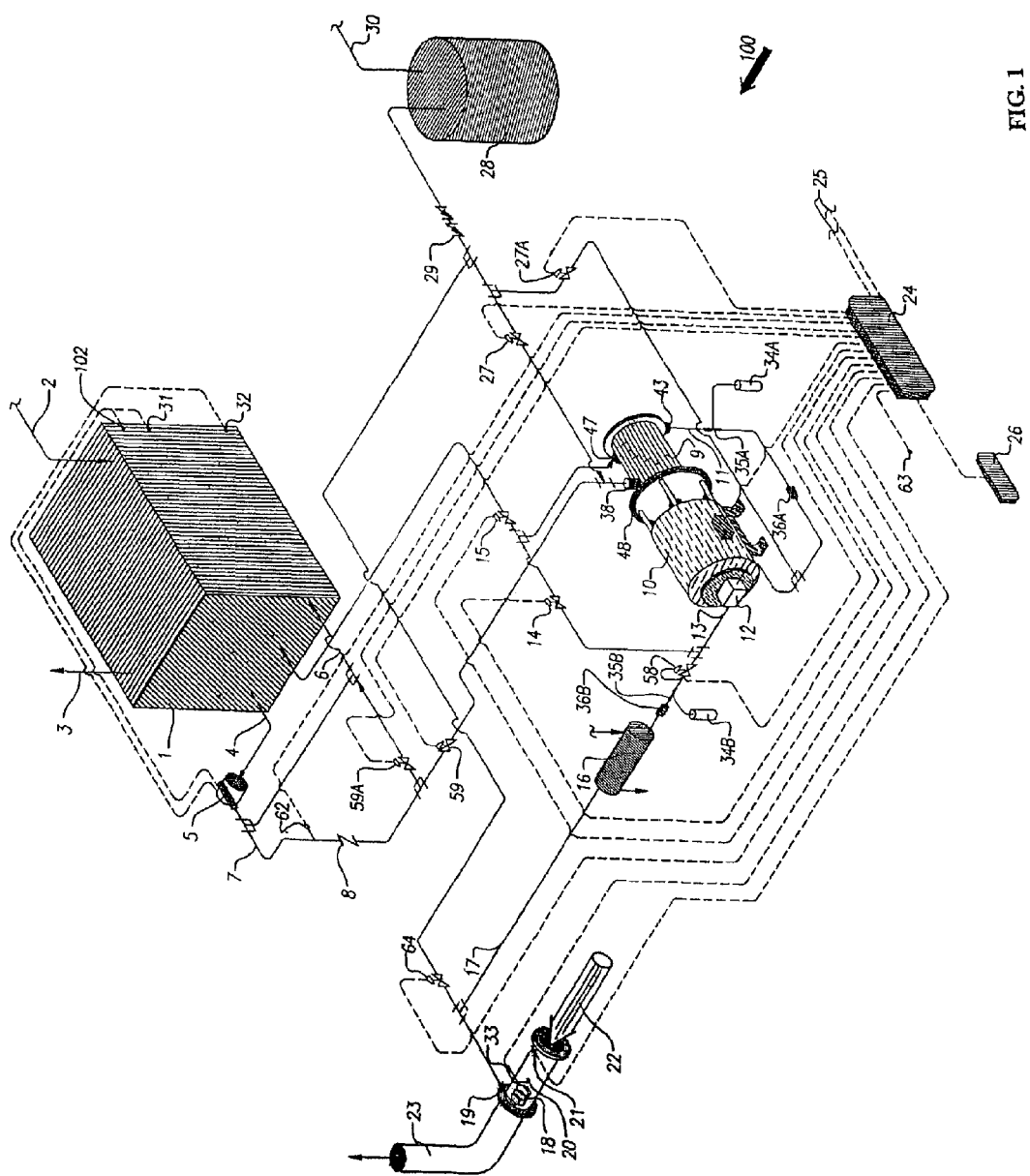
FIG. 1 is a process flow diagram illustrating one preferred embodiment of the improved waste treatment and disposal system of the present invention.

FIG. 1 illustrates one preferred embodiment of waste treatment system 100. Holding tank 1 receives waste from waste generating sources, such as toilets, showers, sinks, kitchens, bilges, and other organic waste sources. The wastes from the generating sources are delivered to holding tank 1 through connecting conduit 2. Holding tank 1 comprises an atmospheric vent 3 and a discharge conduit 4. Waste flows from holding tank 1 to grinder pump 5 via discharge conduit 4. Grinder pump 5 conditions waste from holding tank 1 by reducing the size of any solid waste present in holding tank 1 and macerating the waste in holding tank 1. Ground waste is discharged from grinder pump 5 through conduit 7, which is in fluid communication with homogenizer 9. With homogenizer 9 in service, a portion of the ground waste from grinder pump 5 is recirculated through conduit 6 back to holding tank 1 aiding the maceration of waste in holding tank 1. When homogenizer 9 is not in operation, all of the waste discharged from grinder pump 5 is recirculated back to holding tank 1. Check valve 8 in conduit 7 prevents backflow of waste from homogenizer 9 to holding tank 1.

Homogenizer 9 is driven by primary drive 10, which may be a conventional induction motor or any other device that may be employed to drive centrifugal or positive displacement rotating equipment. Primary drive 10 is preferably a reversing induction motor. In addition to driving homogenizer 9, primary drive 10 may also be used to drive grinder pump 5 via a common shaft. However, for ease of illustration, FIG. 1 shows grinder pump 5 as a discrete pumping unit and not driven by a common shaft. Homogenizer 9 reduces the particle size of the solids content of the waste by passing the waste through a series of cutter blades 39 and sizing screens 40 (best seen in FIGS. 2, 3 and 9) so that no particle of a size larger than the smallest sizing screen opening is allowed to exit homogenizer 9. Any particles larger than the smallest screen opening will remain within homogenizer 9 until they are reduced in size. The liquid portion of the waste is homogenized with substantially uniform sized particles of solid wastes and they are discharged together from homogenizer 9 through conduit 11.

In order to enhance the sterilization and disposal process, a commercially available ozone generator 34A may be employed to precondition the homogenized waste by injecting ozone into conduit 11 via venturi 35A. Ozone sterilizes the waster by destroying bacteria and also provides additional oxygen for the oxidation of organics once injected into exhaust stream 22. While venturi 35A alone achieves sufficiently high ozone dissolution, a mixer may be employed to further increase dissolution. Mechanical, static or other types of mixers may be employed depending on waste characterization, facility constraints, cost, fouling tendency, and mechanical durability. In FIG. 1, high frequency activator 36A, an ultrasonic device, is employed.

The preconditioned homogenized waste is supplied to injector pump 12, which is driven via a common shaft by primary drive 10. Injector pump 12 is preferably a positive displacement type pump. Preconditioned homogenized waste is discharged into conduit 13 from injector pump 12. From conduit 13, the homogenized waste stream is divided. A portion of the homogenized waste stream from conduit 13 is recycled back to holding tank 1. The recycled homogenized waste stream may be further divided by recirculating a portion of the recycled homogenized waste back to homogenizer 9. The homogenized waste recirculated back to homogenizer 9 may be fed to homogenizer 9 through recirculation port 47, as shown in FIGS. 1, 2, 3 and 9, or alternatively may be combined with the feed from holding tank 1 in conduit 7 and fed to homogenizer 9 via inlet port 38.

The balance of the homogenized waste stream from injector pump 12 proceeds to preheater 16, a liquid/liquid heat exchanger. Prior to entering preheater 16, the homogenized waste may be further conditioned by utilizing a second ozone generator 34B and its associated venturi 35B. Similar to its upstream counterpart, high frequency activator 36B is employed to maximize ozone dissolution. Preheater 16, which is preferably a shell and tube type exchanger, may use water or other media associated with an internal combustion engine or other device to transfer heat to the homogenized waste fuel stream. Alternatively, a heat transfer fluid may be employed as an intermediate heat sink, which receives heat from media associated with an internal combustion engine or other device and transfers that heat to the waste stream. Preheating the homogenized waste stream increases the temperature of the water content of the waste stream and reduces the cooling effect on the exhaust stream in which the waste is injected, thus maximizing system throughput. After exiting preheater 16, the waste continues through conduit 17, which feeds preheater 18. Preheater 18 is a gas/liquid heat exchanger, where heat is absorbed into the waste stream from the exhaust 22 ensuring that the water content of the waste stream is near or above its vaporization temperature prior to injection of the waste. With the water content of the waste stream near or above its vaporization temperature, the heat required to flash the water content once the waste is injected is minimized. Preheater 18 may alternatively be a liquid/liquid heat exchanger utilizing a heat transfer fluid to deliver the heat from the exhaust 22 to the waste stream. A spool piece 19 houses preheater 18 and the injector nozzle 20. Spool piece 19 facilitates installation of the system by eliminating any required modifications to existing exhaust manifolds.

Spool piece 19 may also incorporate a fan or similar device to increase the velocity of the exhaust 22, thus ensuring turbulent flow and radial distribution of the injected waste. Alternatively, the flow rate of exhaust 22 may be increased, which would increase its velocity, by supplementing the exhaust 22 with an additional source of material, such as air or recycled exhaust 22.

Waste may be injected into exhaust 22 through injector nozzle 20 either co-current or counter-current to the exhaust 22 flow. To maximize waste distribution across the diameter of spool piece 19, waste is preferably injected counter-current to the exhaust 22 flow. Additionally, a venturi type spool piece may be utilized to draw the waste stream from conduit 17 into exhaust 22. The venturi type spool piece has the additional advantage of atomizing any liquid fraction of the waste stream. Further, a venturi nozzle may be employed. The venturi nozzle is centrally disposed within spool piece 19 and utilizes the exhaust 22 flow to draw the waste stream from conduit 17, similar to the venturi type spool piece. Upon injection of the pre-heated homogenized waste, the water fraction of the waste fuel stream flashes to steam and exits spool piece 19 through exhaust stack 23 along with the exhaust 22. The solid waste particles in the waste stream are dried and absorb sufficient heat to cause oxidation. The oxidation results in the production of inert mineral ash and water vapor. The inert mineral ash and water vapor flow out the exhaust stack 23 with the exhaust 22.

Temperature sensor 21 measures the temperature of the exhaust 22 prior to entering exhaust stack 23. Pressure sensor 33 measures the injector line pressure. Both of these sensors 21, 33 are housed within spool piece 19 and are equipped with transmitters that relay their measured values to computer 24. Computer 24 receives power from the remote or portable facility in which it is installed via power supply lines 25 and controls the operation of the entire system. In addition to exhaust temperature and injector line pressure, computer 24 may receive values from high level sensor 31, low level sensor 32, and high level alarm 102 mounted within holding tank 1. Alternatively, as shown in FIG. 1, high level sensor 31, low level sensor 32, and high level alarm 102 may be routed only to a controller integrated with grinder pump 5. In this configuration, grinder pump 5 operates independently from the rest of the system. With the operation of grinder pump 5 decoupled from the system operation, computer 24 utilizes pressure sensor 62 to ensure grinder pump 5 is in service before allowing waste to flow to homogenizer 9 by opening valve 59. Computer 24 may also receive additional data from the internal combustion engine or other device that delivers exhaust 22 to waste treatment system 100. Computer 24 controls the operation of the system and allows monitoring of internal and external parameters via remote panel 26.

FIG. 1 also illustrates a backflush system and fresh water purge system that enables the backwashing of homogenizer 9 and the purging of various system components. Computer 24 controls the backflush system by reversing the operation of primary drive 10, which reverses the operation of homogenizer 9 and injector pump 12. By reversing the operation of homogenizer 9 and injector pump 12, the system briefly backflushes through homogenizer 9, thereby self-cleaning the internals housed within homogenizer 9. Similarly, computer 24 controls the operation of the purge system by ceasing the processing of waste and allowing the entire system to process only fresh water. Fresh water may be supplied to the system from any source, such as potable water tank 28. In this manner, fresh water from potable water tank 28 purges injector nozzle 20, injector pump 12 and homogenizer 9, as well as any ancillary equipment, such as the preheaters 16, 18, ozone venturis 35A, 35B, and high frequency activators 36A, 36B. A backflow preventer 29 prevents contamination of the potable water tank 28 during backflushing.

Computer 24 controls operation of the various system components via a programmed process control scheme utilizing both flow modulating control valves and full open/full closed type valves, such as solenoid valves. Computer 24 similarly controls the rate of recycled homogenized waste back to homogenizer 9 via recirculation port 47 by modulating recycled homogenized waste flow via control valve 15.

In the preferred embodiment illustrated in FIG. 1, injection rate is controlled by flow control valve 14 and solenoid valves 58, 59. During normal operation, solenoid valves 58, 59 are fully open and control valves 14, 15 modulates flow recirculated back to holding tank 1. The position of control valve 14 is set by computer 24 based upon the measured values of temperature sensor 21 and/or pressure sensor 33. The position of control valve 14 may also be set by other system parameters, such as rotational speed of the device supplying exhaust 22. Shut down systems may be coupled to the operation of solenoid valves 58, 59 and control valves 14, 15, other system components, as well as the backflush and purge systems. For example, if computer 24 receives a signal from the device supplying exhaust 22, such as a predetermined minimum rotational speed value or other measured value, or if a high pressure is measured and transmitted from pressure sensor 33, computer 24 closes solenoid 59, thereby preventing waste from holding tank 1 from entering homogenizer 9. Computer 24 then activates a backwash cycle, clearing homogenizer 9 of any residue. After the backwash cycle, computer 24 receives data verifying that the condition that initialized the backwash has been cleared. If the condition has not been cleared, a second backwash cycle may be employed. Subsequent to the backwash cycle, computer 24 may begin a fresh water purge cycle to ensure the system is free of waste by opening valve 27, 27A or 64 and closing valve 59. Finally, after backwashing and purging cycles have ended, computer 24 closes solenoid valve 58 and fully opens control valve 14 resulting in recirculation of the entire waste stream. The homogenizer 9 can then be placed back in service by computer 24 opening solenoid valve 59 and control valve 15 with the entire homogenizer 9 discharge being recirculated back to holding tank 1 or the homogenizer can remain out of service, wherein only grinder pump 5 is employed to macerate waste in the holding tank 1. In addition to backwash cycles that are initiated by a system parameter, the computer 24 may initiate backwash cycles at predetermined intervals, thus allowing the system to clear itself of waste and operate as a self-cleaning device.

During backwash operation, solenoid valve 58 remains open allowing reversed flow from the injector nozzle 20 through homogenizer 9. In the preferred embodiment, backwash operation is of relatively short duration and only a small amount of material is reverse-flowed through the system. However, the fresh water supply from potable water tank 28 may be routed to the outlet of homogenizer 9 and thereafter routed to holding tank 1 allowing for a longer and more thorough backwash. During purging operation, solenoid valve 59 closes preventing waste from holding tank 1 from entering homogenizer 9. Control valve 27 opens allowing fresh water to enter homogenizer 9 and thereafter flow to injector nozzle 20 via the normal operation route, thus purging all equipment installed between homogenizer 9 and injector nozzle 20. Alternatively, purge water from tank 28 maybe routed to the injector pump 12, via control valve 27A, or spool piece 19, via control valve 64, wherein exchanger 18 and injector nozzle 20 may be purged.

Figure 2:
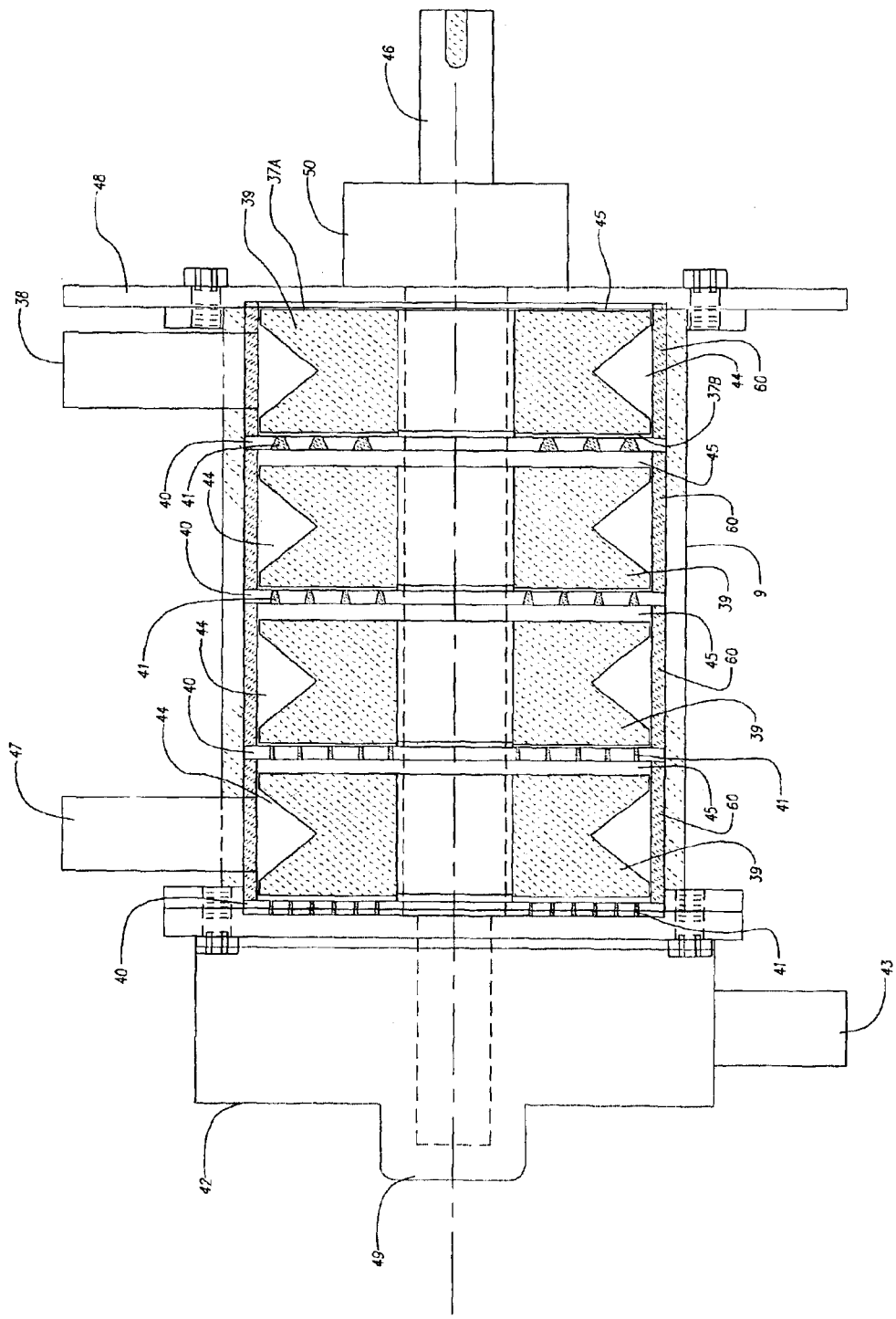
FIG. 2 is a cross-sectional view of one preferred embodiment of the homogenizer featuring an external pump.

FIG. 2 illustrates one preferred embodiment of homogenizer 9. Homogenizer 9 allows solids and liquids to enter the inlet port 38 and to come into contact with a series of homogenizer stages 44. Each homogenizer stage 44 comprises a multi-edge rotating blade 39, a sizing screen 40, a spacer 60, which maintains the distance between individual sizing screens 40, and a reversing space 45. Each rotating blade 39 utilizes at least two cutting edges 37A, 37B. During normal operation, cutting edge 37B operates against the associated sizing screen 40 making up the particular homogenizer stage 44. During backwash, cutting edge 37A operates against the sizing screen 40 associated with the homogenizer stage 44 located directly upstream and separated by reversing space 45. The sizing screen 40 associated with each successive homogenizer stage 44 comprises progressively smaller sizing holes 41, which results in the progressive attrition of solid waste particle size as the waste flows through the homogenizer stages 44.

The reduction in diameter of the sizing holes 41 in the sizing screens 40 in each homogenizer stage 44 allows the solids and liquids to gradually blend. The solids continually decrease in size as they are pulled through homogenizer 9. As waste flows through homogenizer 9, globules of waste are drawn through sizing holes 41. This action is enhanced by the tapering of sizing holes 41. The tapering of sizing holes 41 also results in decreased fouling tendency of the sizing holes 41, thus reducing the potential to plug and the number and duration of backwash cycles. The amount of taper of sizing holes 41 that can be achieved depends upon the thickness of sizing screen 40. The preferred range of thickness of sizing screen 40 is about ¼ of an inch to about 1/32 of an inch. For this range in thickness, the preferred range of taper in sizing holes 41 is about 4% to about 50%. As the globules of waste are drawn through the sizing holes 41 they are sheared by the rotating blade 39 of the next homogenizer stage 44 thus allowing that portion of the waste that penetrated the screen hole 41 to move on to the next stage 44 of the homogenizer 9. The process is repeated in each homogenizer stage 44. The size of the holes 41 in the last homogenizer stage 44 sets the maximum particle size for discharge from the homogenizer 9. While waste quality and the quantity of heat supplied by the exhaust generating source influences the maximum particle size that can be treated by the system, generally, the preferred maximum particle size diameter discharged from homogenizer 9 is about 1/5,000 of an inch to about 1/30,000 of an inch.

Figure 3:
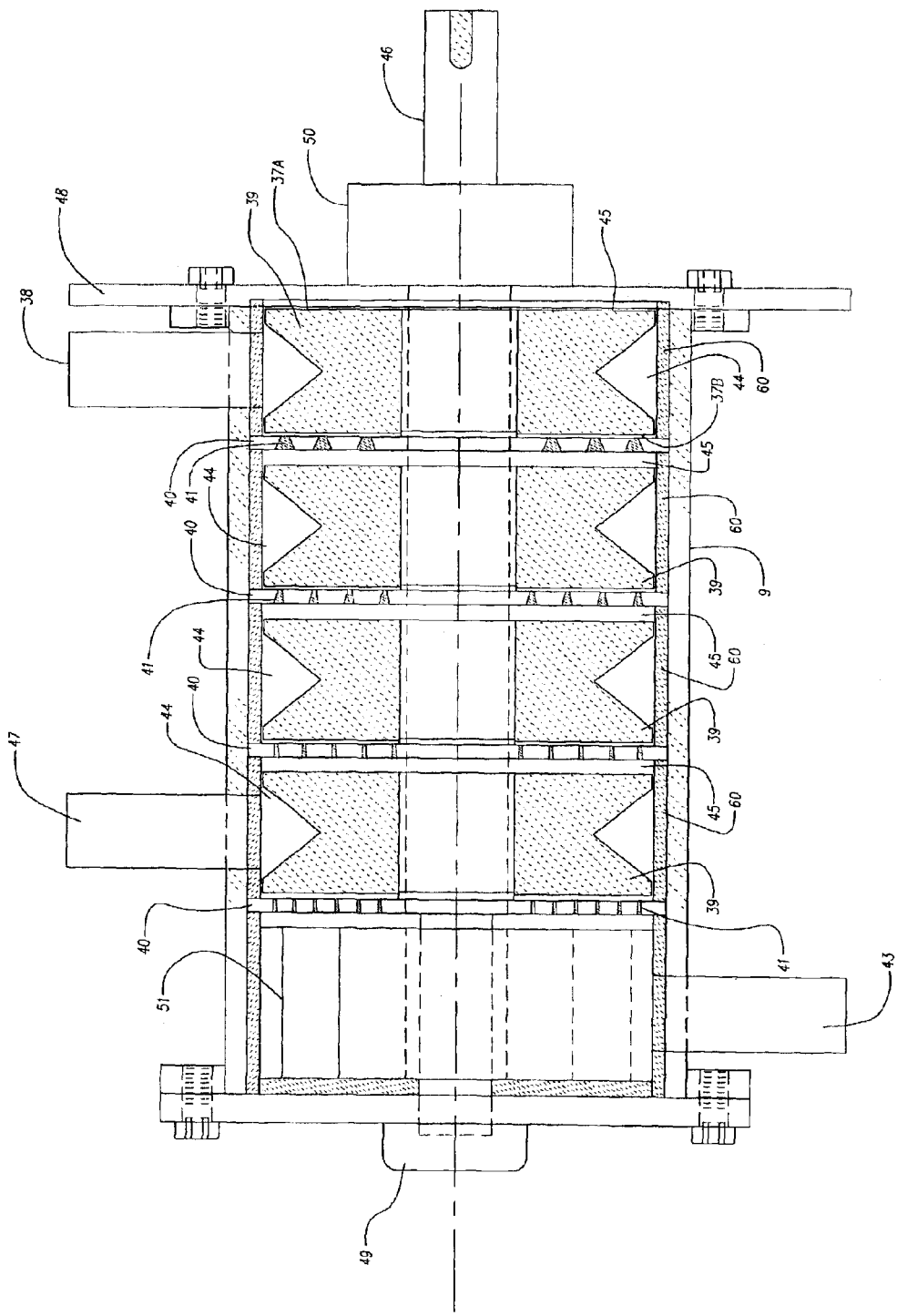
FIG. 3 is a cross-sectional view of another preferred embodiment of the homogenizer featuring an internal pump impeller.

The homogenizer blades 39 are slidingly engaged along shaft 46, which allows the blades 39 to slide forward or backward a predetermined distance as indicated by the reversing space 45. The rotation of the shaft 46 in one direction will cause the blades 39 to make contact with the sizing screens 40 associated with a particular homogenizer stage 44 and upon reversing the direction of the rotation of the shaft 46 the blades 39 will make contact with the backside of the sizing screens 40 associated with the prior homogenizer stage 44 and shear off any residue distributed on the backside of the sizing screen 40. At the same time, upon reversing the rotation of the shaft 46 the effluent is pumped back through the screens 40 removing any residue that might block the tapered holes 41. The homogenizer 9 may employ an external pump 42 (as shown in FIG. 2), an internal pump impeller 51 (as shown in FIG. 3), or no pump at all. If an internal or external pump mechanism is employed, primary mover 10 may drive the mechanism via common shaft 46.

The multi-edge blades 39 may be placed sequentially around the shaft 46 at varying intervals with respect to the previous blade 39. Thus creating a multi-pointed star pattern of blades when a front perspective view is taken, similar to the multi-pointed star pattern shown in FIG. 5. The multiple blade edges make multiple contacts with solids entering each stage 44, thus providing an increased rate of injection based upon a given temperature of exhaust 22 into which the injector 20 is discharging. Regardless of whether an internal pump impeller 51, an external pump 42, or no pump at all is employed with the homogenizer 9, fluid is discharged from homogenizer 9 via outlet port 43. A portion of the discharge waste may be recycled, as described earlier, back into the last homogenizer stage 44 via recirculation port 47. By recirculating a portion of the waste discharged from homogenizer 9, particle size distribution and system performance are improved.

Figure 4:
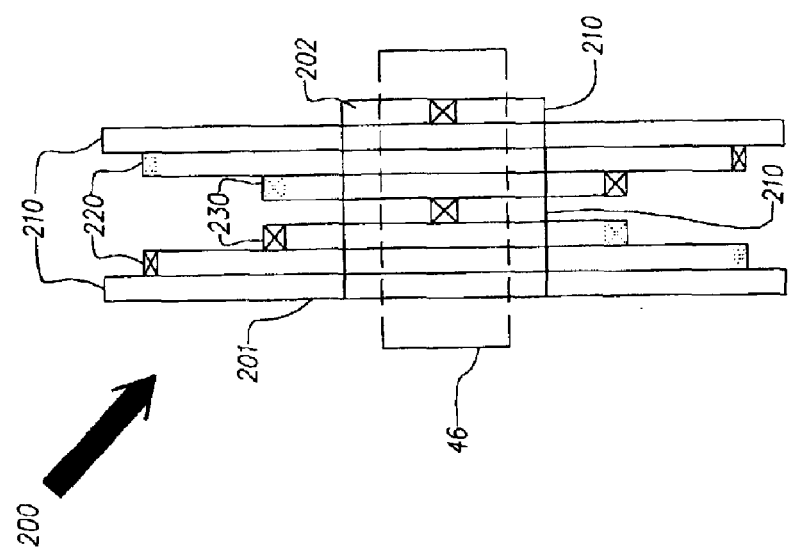
FIG. 4 is a side perspective view of one preferred embodiment of a blade assembly utilized within the homogenizer.

FIG. 4 illustrates another preferred embodiment of the homogenizer blades 39. As shown in FIG. 4, blade assembly 200 comprises a plurality of individual blades 210, 220, 230. The preferred embodiment illustrated in FIG. 4 comprises eight individual blades sequentially disposed along shaft 46. The lowermost blade 201 is disposed along shaft 46 at a zero degree angle with respect to the axis of shaft 46. The blade above the lowermost blade 201 is disposed along shaft 46 at a 30 degree angle with respect to the axis of shaft 46. Each successive blade of bade assembly 200 is disposed along shaft 46 at an angle 30 degrees greater than the preceding blade, which when a front perspective view is taken the star pattern of FIG. 5 emerges. The lowermost blade 201 operates against the sizing screen 40 associated with the homogenizer stage 44 in which blade assembly 200 is installed. The uppermost blade 202 operates against the back side of sizing screen 40 of the homogenizer stage 44 directly upstream of the blade assembly 200 when the primary drive 10 of homogenizer 9 is reversed.

Figure 5:
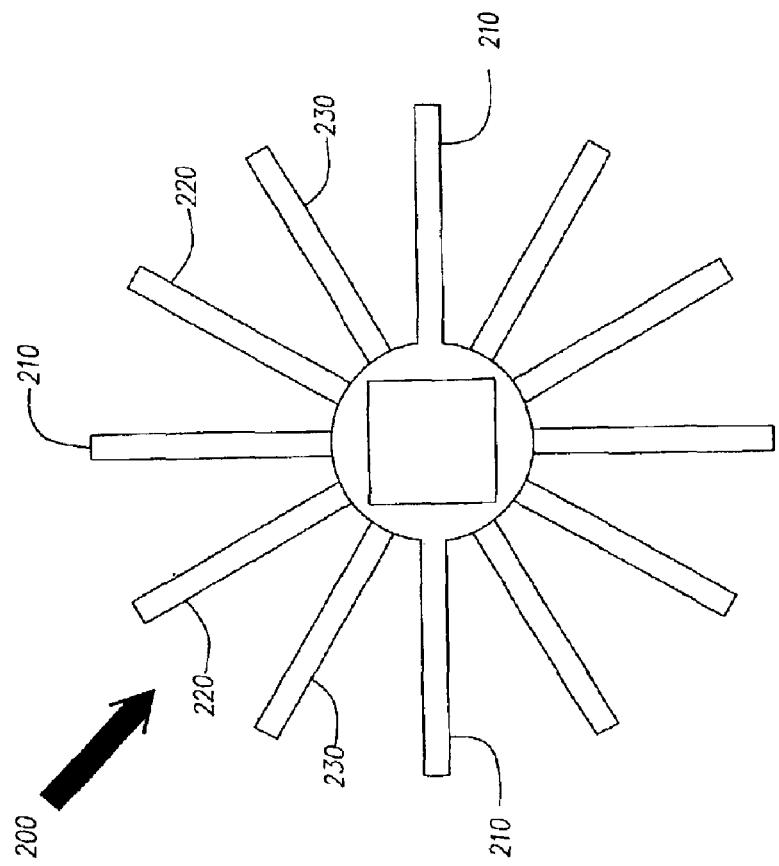
FIG. 5 is a front perspective view of the blade assembly of FIG. 4.

FIG. 5 shows a front view of the star pattern of blade assembly 200. Blade assembly 200 comprises a plurality of blades created by stacking individual blades 210, 220, 230, illustrated respectively in FIGS. 6, 7, and 8.

Blade 210, shown in FIG. 6, comprises at least two cutting appendages 211, 212, which are connected to centerpiece 213. Centerpiece 213 comprises an internal face 214 and is slidingly engaged along shaft 46 such that internal face 214 contacts the surface of shaft 46. In the illustrated preferred embodiment, shaft 46 and internal face 214 both have a substantially square cross-section, which, once assembled, translates the rotation of shaft 46 to blade 210 without any appreciable slip. Alternative means of translating rotation may also be employed for shafts of different cross-section, such as utilizing a shaft key.

Blades 220, 230 shown in FIGS. 7 and 8, respectively, are substantially similar to blade 210. Blade 220 comprises at least two cutting appendages 221, 222, which are connected to centerpiece 223. Blade 230 comprises at least two cutting appendages 231, 232, which are connected to centerpiece 233. As shown in FIG. 7, cutting appendages 221, 222 are connected to centerpiece 223 such that cutting appendages 221, 222 are disposed along shaft 46 at an angle that differs from cutting appendages 211, 212 of blade 210. Similarly, as shown in FIG. 8, cutting appendages 231, 232 are connected to centerpiece 233 such that cutting appendages 231, 232 are disposed along shaft 46 at an angle that differs from cutting appendages 211, 212 of blade 210 and cutting appendages 221, 222 of blade 220. By slidingly engaging blades 210, 220, 230 along shaft 46, a star shaped pattern of cutting appendages emerges, which is best seen in FIG. 5, with cutting appendages radiating outward from shaft 46.

Figure 9:
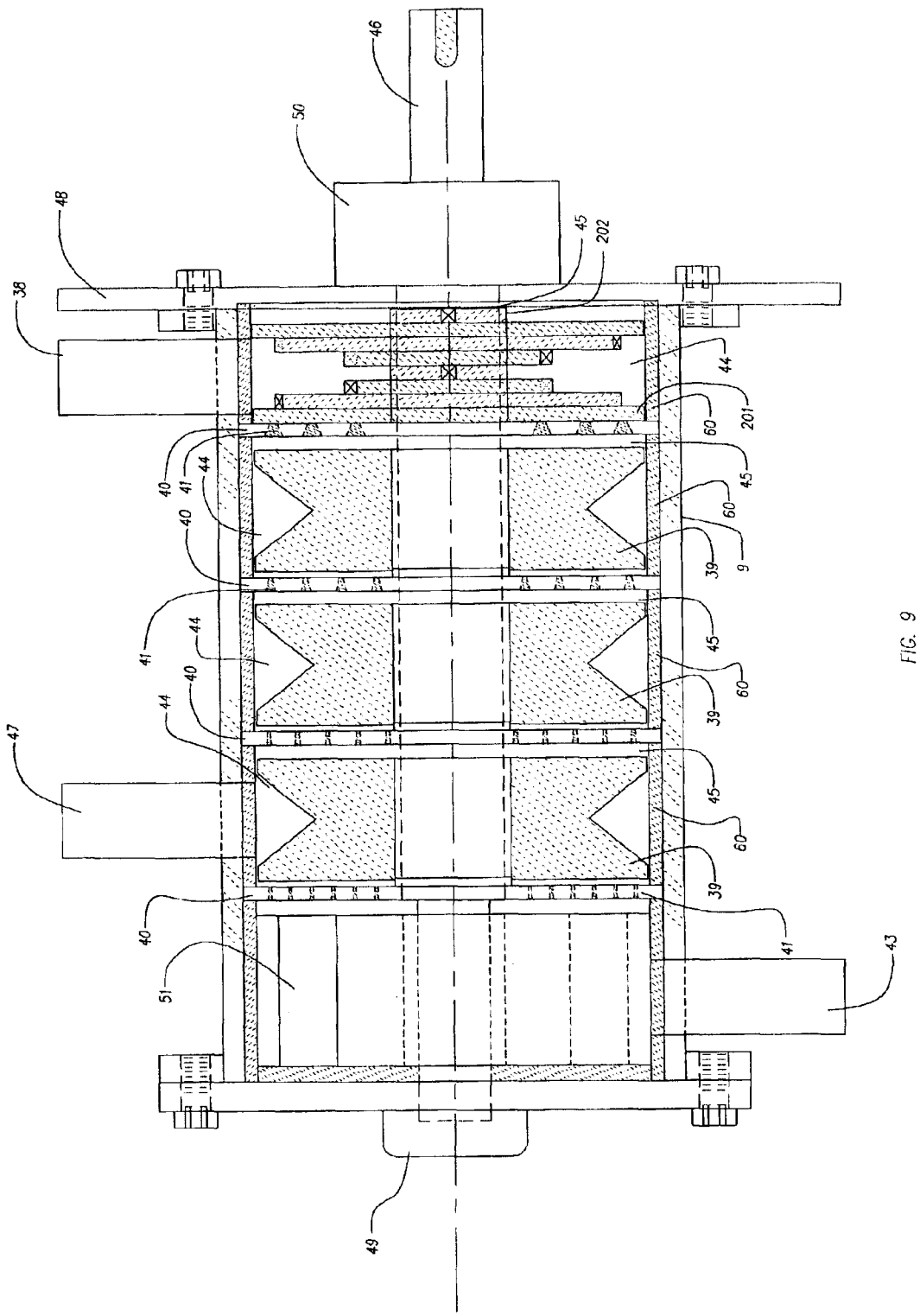
FIG. 9 is a cross-sectional view of one preferred embodiment of the homogenizer featuring the blade assembly of FIG. 4.

Finally, FIG. 9 illustrates homogenizer 9 featuring the blade assembly 200 installed in the first of a plurality of homogenizer stages 44. The remaining homogenizer stages 44 utilize the blades 39, which were depicted in FIG. 2 and described above. The blades 39 are slidingly engaged along shaft 46 such that the blades 39 operate perpendicular to each other. The homogenizer 9 may employ blade assembly 200 in one homogenizer stage 44, in at least two homogenizer stages 44, or in all homogenizer stages 44.

Although the present invention has been described in terms of specific embodiments, it is anticipated that alterations and modifications thereof will no doubt become apparent to those skilled in the art It is therefore intended that the following claims be interpreted as covering all alterations and modifications that fall within the true spirit and scope of the invention.

What is claimed is:

1. A waste treatment and disposal system comprising: at least one waste generating source in fluid communication with a tank for the storage of said waste from said at least one waste generating source, said waste comprising a liquid portion and a solid portion, said tank comprising a discharge conduit for removing said waste from said tank; a means for homogenizing said waste in fluid communication with said discharge conduit, said means for homogenizing comprising a means for reducing the particle size of said solid portion of said waste and a means for mixing said liquid portion of said waste and said solid portion of said waste into a substantially homogenous waste stream, said means for reducing the particle size of said solid portion and said means for mixing said liquid portion and said solid portion occurring substantially simultaneously; a means for heating said substantially homogenized waste stream connected to said means for homogenizing; a means for injecting said substantially homogenized waste stream connected to said means for heating, said means for injecting disposed within an exhaust stream of an exhaust generating source.

2. The waste treatment and disposal system of claim 1, further comprising a means for macerating said waste stored in said tank.

3. The waste treatment and disposal system of claim 1, further comprising at least one means for injecting ozone into said substantially homogenized waste stream.

4. The waste treatment and disposal system of claim 3, further comprising at least one means for mixing said ozone and said substantially homogenized waste stream.

5. The waste treatment and disposal system of claim 1, further comprising a means for purging said means for homogenizing, said means for heating, and said means for injecting with water.

6. The waste treatment and disposal system of claim 1, further comprising an injector pump disposed between said means for homogenizing and said means for injecting said substantially homogenized waste stream.

7. The waste treatment and disposal system of claim 6, wherein said means for homogenizing and said injector pump are powered by a common primary mover.

8. The waste treatment and disposal system of claim 1, wherein said means for injecting said substantially homogenized waste stream comprises an injector nozzle disposed within a conduit capable of connecting to the discharge of said exhaust generating source.

9. The waste treatment and disposal system of claim 8, further comprising a means for inducing an increase in the velocity of said exhaust stream.

10. The waste treatment and disposal system of claim 8, wherein said means for heating said substantially homogenized waste stream comprises a heat exchanger, said heat exchanger utilizing a hot fluid generated by said exhaust generating source to transfer heat to said substantially homogenized waste stream.

11. The waste treatment and disposal system of claim 10, wherein said means for heating said substantially homogenized waste stream is disposed downstream of said injector nozzle within said conduit capable of connecting to the discharge of said exhaust generating source.

12. The waste treatment and disposal system of claim 1, wherein said means for heating said substantially homogenized waste stream comprises a heat exchanger, said heat exchanger utilizing a hot fluid generated by said exhaust generating source to transfer heat to said substantially homogenized waste stream.

13. The waste treatment and disposal system of claim 12, wherein said means for heating said substantially homogenized waste stream further comprises a second heat exchanger disposed downstream of said heat exchanger utilizing a hot fluid generated by said exhaust generating source, said second heat exchanger utilizing said exhaust generated by said exhaust generating source to transfer heat to said substantially homogenized waste stream.

14. The waste treatment and disposal system of claim 1, wherein said means for homogenizing further comprises: a housing having an inlet port and an outlet port; a central shaft disposed within said housing; a means for rotating said central shaft; and at least one homogenizer stage operatively connected to said central shaft; said homogenizer stage comprising a rotating blade having a top edge and a bottom edge, said bottom edge of said rotating blade having a cutting surface, and a sizing screen having a top side, a bottom side, and a plurality of sizing holes permitting travel of the waste stream from said top side to said bottom side of said sizing screen, said top side of said sizing screen in contact with said cutting surface of said bottom edge of said rotating blade.

15. The waste treatment and disposal system of claim 14, wherein said means for homogenizing further comprises a plurality of homogenizer stages, said plurality of homogenizer stages disposed sequentially along said central shaft.

16. The waste treatment and disposal system of claim 15, wherein said inlet port of said housing allows the waste stream to enter the first of said plurality of homogenizer stages and said outlet port allows the discharge of the waste stream exiting the last of said plurality of homogenizer stages.

17. The waste treatment and disposal system of claim 16, wherein said top side of each said sizing screen of each said sequential homogenizer stage comprises a plurality of sizing holes having a smaller diameter than the previous homogenizer stage.

18. The waste treatment and disposal system of claim 17, wherein said plurality of sizing holes on each said sizing screen of each said sequential homogenizer stage are tapered.

19. The waste treatment and disposal system of claim 18, wherein said taper of said sizing holes increases from said top side of said sizing screen to said bottom side of said sizing screen.

20. The waste treatment and disposal system of claim 16, wherein said means for rotating said central shaft is a reversing motor having a normal rotation and a reverse rotation.

21. The waste treatment and disposal system of claim 20, wherein said rotating blades of each said sequential homogenizer stage further comprise a second cutting surface disposed along said top edge of said rotating blades.

22. The waste treatment and disposal system of claim 21, wherein said rotating blades of each said sequential homogenizer stage are slidingly engaged with said central shaft such that when said reversing motor operates in said reverse rotation, said rotating blades slide along said central shaft causing said cutting surface of said top edge of said rotating blades to make contact with said bottom side of said sizing screen of the previous homogenizer stage.

23. The waste treatment and disposal system of claim 16, wherein said housing further comprises a recirculation port in fluid communication with said outlet port, said recirculation port allowing a portion of the discharge of the waste stream exiting the last of said plurality of homogenizer stages through said outlet port to be recirculated back into the last of said plurality of homogenizer stages through said recirculation port.

24. The waste treatment and disposal system of claim 23, further comprising a means for pumping the waste stream through said plurality of homogenizer stages.

25. The waste treatment and disposal system of claim 24, wherein the means for pumping comprises an impeller operatively connected to said central shaft and disposed within said housing.

26. The waste treatment and disposal system of claim 24, wherein the means for pumping comprises an external pump in fluid communication with said plurality of homogenizer stages.

27. The waste treatment and disposal system of claim 23, wherein said external pump is powered by said means for rotating said central shaft.

28. An apparatus for homogenizing a waste stream having a liquid portion and a solid portion, said apparatus comprising: a housing having an inlet port and an outlet port; a central shaft disposed within said housing; a means for rotating said central shaft; and at least one homogenizer stage operatively connected to said central shaft; said homogenizer stage comprising a rotating blade having a top edge and a bottom edge, said bottom edge of said rotating blade having a cutting surface, and a sizing screen having a top side, a bottom side, and a plurality of sizing holes permitting travel of the waste stream from said top side to said bottom side of said sizing screen, said top side of said sizing screen in contact with said cutting surface of said bottom edge of said rotating blade.

29. The apparatus of claim 28, further comprising a plurality of homogenizer stages, said plurality of homogenizer stages disposed sequentially along said central shaft.

30. The apparatus of claim 29, wherein said inlet port of said housing allows the waste stream to enter the first of said plurality of homogenizer stages and said outlet port allows the discharge of the waste stream exiting the last of said plurality of homogenizer stages.

31. The apparatus of claim 30, wherein said top side of each said sizing screen of each said sequential homogenizer stage comprises a plurality of sizing holes having a smaller diameter than the previous homogenizer stage.

32. The apparatus of claim 31, wherein said plurality of sizing holes on each said sizing screen of each said sequential homogenizer stage are tapered.

33. The apparatus of claim 32, wherein said taper of said sizing holes increases from said top side of said sizing screen to said bottom side of said sizing screen.

34. The apparatus of claim 30, wherein said means for rotating said central shaft is a reversing motor having a normal rotation and a reverse rotation.

35. The apparatus of claim 34, wherein said rotating blades of each said sequential homogenizer stage further comprise a second cutting surface disposed along said top edge of said rotating blades.

36. The apparatus of claim 35, wherein said rotating blades of each said sequential homogenizer stage are slidingly engaged with said central shaft such that when said reversing motor operates in said reverse rotation, said rotating blades slide along said central shaft causing said cutting surface of said top edge of said rotating blades to make contact with said bottom side of said sizing screen of the previous homogenizer stage.

37. The apparatus of claim 30, wherein said housing further comprises a recirculation port in fluid communication with said outlet port, said recirculation port allowing a portion of the discharge of the waste stream exiting the last of said plurality of homogenizer stages through said outlet port to be recirculated back into the last of said plurality of homogenizer stages through said recirculation port.

38. The apparatus of claim 37, further comprising a means for pumping the waste stream through said plurality of homogenizer stages.

39. The apparatus of claim 38, wherein the means for pumping comprises an impeller operatively connected to said central shaft and disposed within said housing.

40. The apparatus of claim 38, wherein the means for pumping comprises an external pump in fluid communication with said plurality of homogenizer stages.

41. The apparatus of claim 40, wherein said external pump is powered by said means for rotating said central shaft.

42. A method of treating and disposing of a waste stream having a liquid portion and a solid portion comprising the steps of: storing said waste stream in a tank, said/tank comprising a discharge conduit for removing said waste from said tank; providing a means for homogenizing said waste in fluid communication with said discharge conduit, said means for homogenizing comprising a means for reducing the particle size of said solid portion of said waste and a means for mixing said liquid portion of said waste and said solid portion of said waste into a substantially homogenous waste stream, said means for reducing the particle size of said solid portion and said means for mixing said liquid portion and said solid portion occurring substantially simultaneously; heating said substantially homogenized waste stream generated by said means for homogenizing; and injecting said heated substantially homogenized waste stream into an exhaust stream of an exhaust generating source.

43. The method of claim 42, wherein said means for homogenizing further comprises: a housing having an inlet port and an outlet port; a central shaft disposed within said housing; a means for rotating said central shaft; and a plurality of homogenizer stages operatively connected to said central shaft; each of said plurality of homogenizer stages comprising a rotating blade having a top edge and a bottom edge, said bottom edge of said rotating blade having a cutting surface, and a sizing screen having a top side, a bottom side, and a plurality of sizing holes permitting travel of the waste stream from said top side to said bottom side of said sizing screen, said top side of said sizing screen in contact with said cutting surface of said bottom edge of said rotating blade.

44. The method of claim 43, wherein said inlet port of said housing allows the waste stream to enter the first of said plurality of homogenizer stages and said outlet port allows the discharge of the waste stream exiting the last of said plurality of homogenizer stages.

45. The method of claim 44, wherein said means for rotating said central shaft is a reversing motor having a normal rotation and a reverse rotation.

46. The method of claim 45, wherein said rotating blades of each said sequential homogenizer stage further comprise a second cutting surface disposed along said top edge of said rotating blades.

47. The method of claim 46, wherein said rotating blades of each said sequential homogenizer stage are slidingly engaged with said central shaft such that when said reversing motor operates in said reverse rotation, said rotating blades slide along said central shaft causing said cutting surface of said top edge of said rotating blades to make contact with said bottom side of said sizing screen of the previous homogenizer stage.

48. The method of claim 42, wherein said heated substantially homogenized waste stream is injected into the exhaust of an internal combustion engine.

49. An apparatus for homogenizing a waste stream having a liquid portion and a solid portion, said apparatus comprising: a housing having an inlet port and an outlet port; a central shaft disposed within said housing; a means for rotating said central shaft; and at least one homogenizer stage operatively connected to said central shaft, said at least one homogenizer stage comprising a stacked rotating blade assembly, said stacked rotating blade assembly comprising a plurality of stacked rotating blades having an uppermost stacked rotating blade and a bottommost stacked rotating blade, each one of said plurality of stacked rotating blades comprising at least one cutting appendage; and a sizing screen having a top side, a bottom side, and a plurality of sizing holes permitting travel of the waste stream from said top side to said bottom side of said sizing screen, said top side of said sizing screen in contact with said at least one cutting appendage of said bottommost stacked rotating blade.

50. The apparatus of claim 49, further comprising a plurality of homogenizer stages, said plurality of homogenizer stages disposed sequentially along said central shaft.

51. The apparatus of claim 50, wherein said inlet port of said housing allows the waste stream to enter the first of said plurality of homogenizer stages and said outlet port allows the discharge of the waste stream exiting the last of said plurality of homogenizer stages.

52. The apparatus of claim 51, wherein said top side of each said sizing screen of each said sequential homogenizer stage comprises a plurality of sizing holes having a smaller diameter than the previous homogenizer stage.

53. The apparatus of claim 52, wherein said plurality of sizing holes on each said sizing screen of each said sequential homogenizer stage are tapered.

54. The apparatus of claim 53, wherein said taper of said sizing holes increases from said top side of said sizing screen to said bottom side of said sizing screen.

55. The apparatus of claim 50, wherein said means for rotating said central shaft is a reversing motor having a normal rotation and a reverse rotation.

56. The apparatus of claim 55, wherein said stacked rotating blade assembly of each said sequential homogenizer stage are slidingly engaged with said central shaft such that when said reversing motor operates in said reverse rotation, said stacked rotating blade assembly slides along said central shaft causing said at least one cutting appendage of said uppermost stacked rotating blade to make contact with said bottom side of said sizing screen of the previous homogenizer stage.

57. The apparatus of claim 56, wherein said housing further comprises a recirculation port in fluid communication with said outlet port, said recirculation port allowing a portion of the discharge of the waste stream exiting the last of said plurality of homogenizer stages through said outlet port to be recirculated back into the last of said plurality of homogenizer stages through said recirculation port.

* * * * *